March 21, 1961  E. C. KIEKHAEFER  2,976,439

FLYWHEEL MAGNETO

Filed Sept. 26, 1957

INVENTOR.
ELMER C. KIEKHAEFER
BY
Andrus, Sceales & Starke
ATTORNEYS

United States Patent Office

2,976,439
Patented Mar. 21, 1961

2,976,439

FLYWHEEL MAGNETO

Elmer Carl Kiekhaefer, 157 Western Ave., Cedarburg, Wis.

Filed Sept. 26, 1957, Ser. No. 686,483

2 Claims. (Cl. 310—153)

This invention relates to magnetos of the type in which the rotary element of the magneto is carried on the flywheel of the engine. More particularly the invention is directed to an improved means for fabricating the flywheel magnet combination and also to an improved magnet ring.

In conventional practice, magnets have been located and fastened in a flywheel by special wedges and screws. The magnets must be firmly anchored in the flywheel to prevent their becoming loose and, if fastened by screws, this loosening possibility always exists. In conventional practice, these magnets have also been brazed to the flywheel. However, some alloys in use today for magnets cannot be brazed without losing some of their magnetic properties.

The magnets must also be very accurately positioned in the flywheel to assure proper functioning with their associated parts in respect to which they must move at high speeds and within close tolerances. Furthermore, these flywheel alternators should have no delicate or adjustable parts which may become loosened and cause malfunctioning.

These flywheels are preferably made of steel nodular iron or other ferrous metal, because of the high strength requirements of this part and also because the steel is effective in completing the path for the flux at the side of the magnet remote from the stator.

In accordance with this invention, a ferrous metal flywheel has been provided in which permanent magnets are fixedly and accurately positioned therein to form an improved rotary member of a magneto.

The invention further provides a novel magnet ring which not only assures that the magnets are properly positioned and spaced, but also that they are economical to manufacture. In accordance with the invention, all of the magnets are cast together as an assembly which eliminates the necessity of breaking the magnets apart for separate finishing, positioning and securing within the flywheel.

Problems have been encountered, however, in attempting to manufacture an integral ring of magnets. For example, the interconnecting strip of metal between the magnets often caused short circuiting between the opposite poles of the magnets adjacent the stator.

By means of this invention, the construction of the integral magnet ring is such that there is no short circuiting between the opposite poles of adjacent magnets. In other words, the positioning and size of the interconnecting portions of the magnet ring are such that they form very high reluctance paths and cannot transfer magnetism between the magnets at their side adjacent the stator, and thereby the coils of the stator effectively cut the magnetic flux passing between the magnets. Furthermore, the interconnecting magnet ring portions act to aid the flywheel in completing the flux path at the outer sides of the magnets to thereby conduct the flux between the magnets.

These and other objects and advantages will appear hereinafter as this disclosure progresses, reference being had to the accompanying drawings in which.

Figure 1:
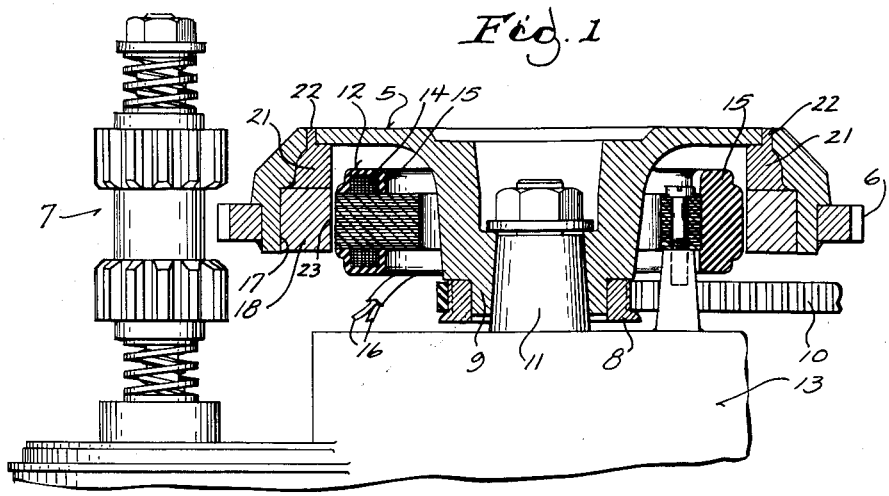
Figure 1 is an elevational section view of a flywheel magneto made in accordance with this invention.

Referring more particularly to the drawings, the steel flywheel 5 has a starter ring gear 6 rigidly secured around its periphery which is engaged by the starter pinion unit 7. A pulley 8 is shrink-fitted on the hub portion 9 of the flywheel for receiving the timing belt 10. A crankshaft 11 of an internal combustion engine is secured by key 11a to the flywheel in driving relationship therewith.

The stator-alternator 12 of the magneto is non-rotatably mounted on an engine 13 and is located within the flywheel. The stator has the usual coils 14 which are molded in an insulating compound 15. The alternating current generated in the stator windings passes by wires 16 to the rectifier (not shown) but which is conventional and produces direct curent from the alternating current.

The flywheel has an internal circumferential surface 17 against which the magnet ring 18 is mounted. It will be noted that the individual magnets 19 are all interconnected together by thin bands 20 of the same material of which the magnets are made. The magnet ring is formed as a single integral piece by casting. It should also be noted that the bands 20 are located toward the radially outer edge of the magnets and closely adjacent the flywheel internal surface 17.

The magnet ring 18 is firmly anchored within the flywheel by means of a non-magnetic material such as aluminum 21 which has been die cast between the magnet ring and the flywheel. Apertures 22 through the top of flywheel serve to anchor the aluminum which fills the spaces between the individual magnets. After the magnet ring has thus been anchored fixedly in place by the aluminum, the internal surface 23 of the magnet ring would be machined to form the close tolerance limits with the stator.

Figure 2:
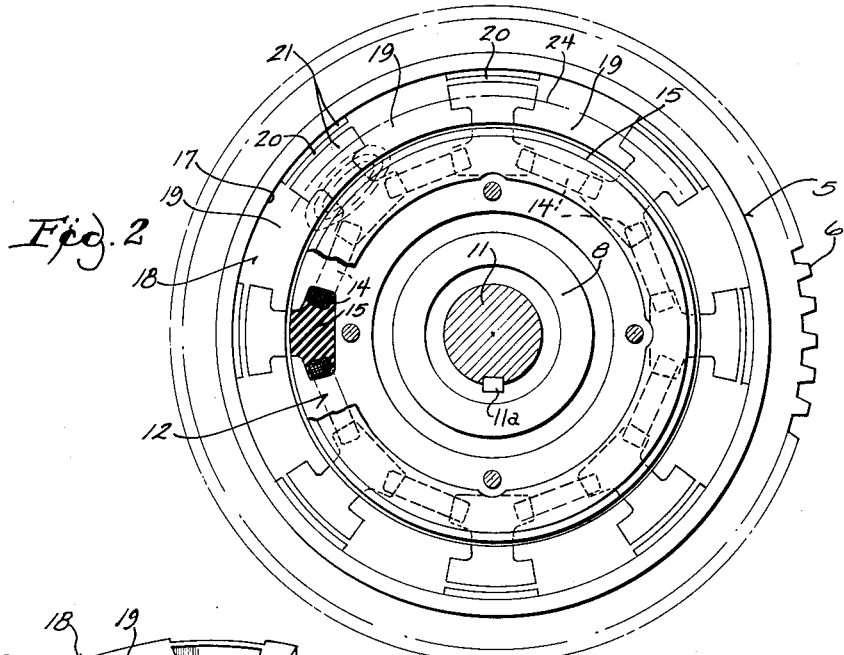
Figure 2 is a bottom view of the magneto shown in Figure 1, parts being broken away and in section for clarity.
Figure 3:
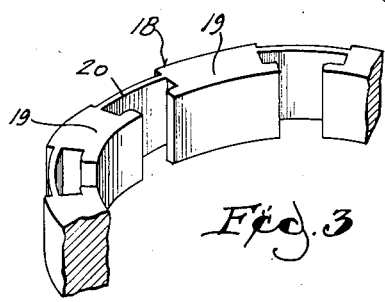
Figure 3 is a fragmentary perspective view of the magnet ring shown in Figures 1 and 2.

The bands 20 which connect the magnets must be very thin in cross section so as to form a high reluctance path to the flow of magnetism from one magnet to another, particularly across the adjacent radial inner ends of the magnets. As shown by the broken lines in Figure 2, the lines of magnetic flux must flow between the inner ends of the magnets so as to be cut by the coils. Therefore the bands 20 are of thin cross section and located to the outer sides of the magnets preferably radially outwardly of the circumferential centerline 24 of the magnets so as to prevent any short circuiting between the inner ends of the magnets. By locating the bands 20 in the back of the magnets, or away from the coils, there is not only less danger of short circuiting the magnets adjacent the coils, but any magnetism that is passed directly therethrough actually aids the ferrous metal flywheel in completing the flux path at the outer sides of the magnets.

A flywheel magneto has been provided which is economical to produce and highly efficient in performing its intended functions. It is rugged and does not easily become out of adjustment. It is unnecessary to individually machine the magnets and accurately locate each one in place which results in eliminating a considerable amount of handling. The magnets are securely anchored in position and cannot cause malfunctioning due to looseness and misalignment.

Various modes of carrying out the invention are con-

I claim:

1. A method of making a flywheel magnet assembly, the steps comprising forming a flywheel having an annular flange of magnetizable material, casting a ring of circumferentially spaced and connected magnets independently of said flywheel, assembling and supporting the magnet ring within the formed flywheel with the outer surface of the magnets being adapted to engage the inner surface of the flywheel flange, and casting a non-magnetic material between the magnet ring and the flywheel to secure the ring within the flywheel.

2. In a flywheel magneto assembly for an internal combustion engine, a flywheel of magnetizable material including a disc-like portion adapted to be secured to an engine shaft and an integral annular flange, a plurality of circumferentially spaced permanent magnets connected together by thin integral bands of the magnet material to form a magnet ring with the bands disposed outwardly of the circumferential centerline through the magnets and inwardly from the outer extremity of the magnets, said ring being disposed within the flywheel with the outer extremities of the magnets in engagement with the internal surface of the annular flange, and means for securing said magnet ring within the flywheel comprising non-magnetic material cast between adjacent magnets, the bands and the adjacent flange portions, and adapted to anchor the magnet ring to the adjacent flywheel portions between the magnet ring and the disc-like portion.

References Cited in the file of this patent

UNITED STATES PATENTS

| | | |
|---|---|---|
| 1,907,343 | Carpenter | May 2, 1933 |
| 2,193,675 | Merrill | Mar. 12, 1940 |
| 2,568,479 | Armstrong | Sept. 18, 1951 |
| 2,680,822 | Brainard | June 8, 1954 |
| 2,688,101 | Harsch | Aug. 31, 1954 |
| 2,736,827 | Buchmann | Feb. 28, 1956 |

FOREIGN PATENTS

| | | |
|---|---|---|
| 587,205 | Great Britain | Apr. 17, 1947 |